US006656044B1

(12) United States Patent
Lewis

(10) Patent No.: US 6,656,044 B1
(45) Date of Patent: Dec. 2, 2003

(54) BINGO/POKER GAME

(76) Inventor: Stanley Lewis, 7330 Flintstone St., Las Vegas, NV (US) 89123

(*) Notice: Subject to any disclaimer, the term of this patent is extended or adjusted under 35 U.S.C. 154(b) by 337 days.

(21) Appl. No.: 09/585,104

(22) Filed: May 31, 2000

(51) Int. Cl.[7] .......................... A63F 13/00; A63F 9/24; G06F 17/00; G06F 19/00

(52) U.S. Cl. ............................ 463/19; 463/16; 463/17; 463/18; 463/20; 463/21; 463/22; 463/25; 273/138.1; 273/139; 273/269; 273/271

(58) Field of Search ............................ 463/19, 25, 20, 463/21, 22, 16, 17, 18; 273/269, 270, 271, 274, 138.1, 139

(56) References Cited

U.S. PATENT DOCUMENTS

| | | | | | |
|---|---|---|---|---|---|
| 3,534,963 | A | * | 10/1970 | Weimer | 273/269 |
| 4,364,567 | A | * | 12/1982 | Goott | 273/144 B |
| 4,756,531 | A | * | 7/1988 | DiRe et al. | 273/143 R |
| 4,856,787 | A | * | 8/1989 | Itkis | 273/237 |
| 4,926,327 | A | * | 5/1990 | Sidley | 359/501 |
| 5,007,649 | A | * | 4/1991 | Richardson | 273/269 |
| 5,242,163 | A | * | 9/1993 | Fulton | 273/85 CP |
| 5,297,802 | A | * | 3/1994 | Pocock et al. | 273/269 |
| 5,351,970 | A | * | 10/1994 | Fioretti | 273/269 |
| 5,393,057 | A | * | 2/1995 | Marnell, II | 273/269 |
| 5,482,289 | A | * | 1/1996 | Weingardt | 273/269 |
| 5,647,798 | A | * | 7/1997 | Falciglia | 273/138.2 |
| 5,813,911 | A | * | 9/1998 | Margolin | 463/19 |
| 5,823,873 | A | * | 10/1998 | Moody | 273/292 |
| 5,833,537 | A | * | 11/1998 | Barrie | 463/21 |
| 5,857,911 | A | * | 1/1999 | Fioretti | 463/40 |
| 5,882,260 | A | * | 3/1999 | Marks et al. | 273/292 |
| 5,909,875 | A | * | 6/1999 | Weingardt | 273/269 |
| 5,935,002 | A | * | 8/1999 | Falciglia | 273/143 R |
| 5,971,849 | A | * | 10/1999 | Falciglia | 273/292 |
| 5,984,779 | A | * | 11/1999 | Bridgeman et al. | 273/138.2 |
| 6,079,711 | A | * | 6/2000 | Wei et al. | 273/269 |
| 6,126,542 | A | * | 10/2000 | Fier | 273/138.2 |
| 6,250,685 | B1 | * | 6/2001 | Walker et al. | 283/49 |
| 6,322,309 | B1 | * | 11/2001 | Thomas et al. | 273/139 |

* cited by examiner

*Primary Examiner*—Jessica Harrison
*Assistant Examiner*—Binh-An D. Nguyen
(74) *Attorney, Agent, or Firm*—Philip J. Anderson; Anderson & Morishita, LLC

(57) ABSTRACT

A device and method are set forth playing a game of Bingo while at the same time playing Poker. A processor displays a player Bingo card representing a 5×5 matrix and selects a virtue card against which the player competes. Each matrix coordinate has a Bingo number/letter assigned thereto. Bingo numbers are selected and compared to those on the matrices. At each concordance, a playing card value is assigned. The selection is terminated when the virtual Bingo card or player Bingo card obtains a predetermined Bingo. For any predetermined patterns formed by card values on the player Bingo card, the player receives an award. Also the player can select a row, column or diagonal and use the selected cards to form a Poker hand. If the player obtains a predetermined Poker holding, the played receives and award.

10 Claims, 2 Drawing Sheets

BINGO/POKER GAME

FIELD OF THE INVENTION

The present invention relates to an electronic game which includes play of Bingo with the play of a video poker game.

BACKGROUND

Bingo is a very popular game. In Bingo a player buys a Bingo card which consists of a 5×5 matrix of numbers arranged under columns identified by the letters B-I-N-G-O. A device selects balls each designated by one of the column letters and a number, e.g. B27. If the column letter and number correspond to a number on the player's card, the player marks the coordinate on the card. The selection of balls continues until a player obtains a winning pattern of marked coordinates on his card. The winning pattern may be a column, row, diagonal, corners or a completely marked card. The player first obtaining the designated winning pattern, is the winner of the game.

Some electronic games which incorporate the principles of Bingo are disclosed in Helm et al. U.S. Pat. No. 4,743,024 and Falciglia U.S. Pat. No. 5,647,798, the disclosures of which are hereby incorporated by reference.

There is also a parlor game known as Pokeno wherein a plurality of playing cards are printed on game cards defining a matrix. At each coordinate of the matrix there is a depiction of a playing card. To play the game, a player selects one or more game cards and cards from a deck of cards are turned over from a deck of cards and are used like balls in Bingo, to select coordinates on the game card matrix to be marked by the player. Again the game may be played by designating the winner as the first player to mark a straight column, diagonal, row, diagonal, corners, a completely filled card or any other predetermined pattern. Playing cards are drawn in succession until a winner is declared.

A drawback with Bingo is that in a game, usually only one player is the winner. Thus, unless that player has a winning card, they lose. This can be frustrating.

It has been known to provide electronic gaming devices wherein a player can make a wager of a credit, tokens or the like and play what is commonly known as video poker. In video poker, the gaming device is provided with a processor which includes a data structure storing data representing each of the fifty-two playing cards of a deck of playing cards, and in some instances where the game includes a wild joker, a fifty-third card representing the aforementioned wild joker. The player makes the wager and prompts the game to randomly select five cards from the data structure and display those cards at a video display to define the initial hand. The player has the option of discarding none, some or all of the cards of the initial hand and receiving replacements for the discarded cards randomly selected from the data structure in an effort to better his hand and produce a final hand. The card combination of the final hand is compared by the processor to a schedule of winning outcomes to determine of the player has a winning or losing outcome. Typically winning outcomes are based upon poker rankings of the final hand.

Video Poker is a very popular game. However, if the player does not obtain a winning hand after several plays, the game can become frustrating. Unless a winning hand is obtained, the player has no opportunity to receive a reward.

There is a need to provide a device and method where a Bingo player has at least one other opportunity, unrelated to his Bingo card, to obtain a winning outcome. Further, it would be advantageous to incorporate the popular and familiar game of Bingo the play of video Poker.

SUMMARY OF THE INVENTION

One of the objects of the present invention is to provide a device and game method wherein a Bingo game can be played which also includes as an adjunct, the play video Poker.

It is another object to provide a device and game method where a player losing their Bingo game card may still be entitled to an award by playing a video Poker game.

Still another object is to provide a device and game wherein a primary Bingo game is played and the adjunct video Poker hand can be played in the traditional fashion.

Accordingly, there is set forth a device and method for playing a video gaming machine which includes the features of Bingo and video Poker which consists of providing a processor to control the play of the game and a display. The processor has a memory storing data corresponding to a display of a matrix of positions, such as a five-by-five matrix, defining a Bingo card. The processor is adapted to assign to each position data representing a Bingo number/letter combination and to each Bingo number/letter drawn during the game of Bingo assign a playing card as it is randomly selected from a deck of playing cards.

The player makes a wager to play the game and prompts play of the game. In response to prompting the processor selects and displays for the player at least one player Bingo card having coordinates with corresponding Bingo numbers assigned to columns denoted as the letters B-I-N-G-O which is conventional to Bingo. The processor also selects at least one virtual Bingo card against which the player will compete. The Bingo number/letters are selected from data representing the universe of available Bingo number/letter combinations. For example, the selection may be animated showing a Bingo hamper containing balls each bearing a number and a letter, e.g. B6. If a concordance exits between the selected ball and a coordinate on the player's or the virtual Bingo card, the matrix position is marked. At least each matching ball finding a concordance on the player's card also has assigned to it a playing card which may be used to mark the Bingo card. When either a virtual or player Bingo card obtains a predetermined pattern of marked coordinates the selection of cards is terminated. If any player Bingo card has a predetermined pattern of marks or cards such as a row, column, diagonal, four corners or the like, the player is issued a Bingo award. Further, means are provided for the player to select on a player card a row, column or diagonal having marked coordinate positions and selected playing cards to be used to define a Poker hand. If the Poker hand for the cards of the marked positions in the selected row/column, etc. is of a predetermined holding, the player is issued a Poker award. In determining the holding of the Poker hand, unselected coordinates in the selected row, column or diagonal may be designated as Aces or wild to fill a straight or a flush. As a further feature, the player may be provided with means to discard and replace cards of the selected row, column or diagonal to form a final Poker hand.

Accordingly the player can win a reward by obtaining a winning Bingo pattern in the primary Bingo game or by obtaining a winning Poker hand in the secondary Poker game.

As a further advantage, the player may be provided with the opportunity for activating two or more Bingo cards to enable him to simultaneously play a plurality of Bingo cards and video Poker hands. Thus the player is provided with multiple opportunities to obtain a winning outcome.

A further advantage of the present invention, is that it may be played with any type of video Poker game including those where multiple hands are played such as described in Moody, U.S. Pat. No. 5,823,873, the disclosure of which is hereby incorporated by reference. Where multiple hands are played, the player would obtain more opportunities to mark positions on the Bingo matrix thus increasing their chances for obtaining a reward from the Bingo component and/or Poker component of the game.

Still further, large awards may be offered for outcomes which represent specific combinations of Bingo and Poker outcomes. For example, a player may be offered a large award for obtaining a Royal Flush Poker hand and marking a column, row or the corners of a Bingo card.

BRIEF DESCRIPTION OF THE DRAWINGS

These and other features and advantageous will become appreciated as the same becomes better understood with reference to the description, claims and drawings, wherein:

DESCRIPTION

Figure 1:
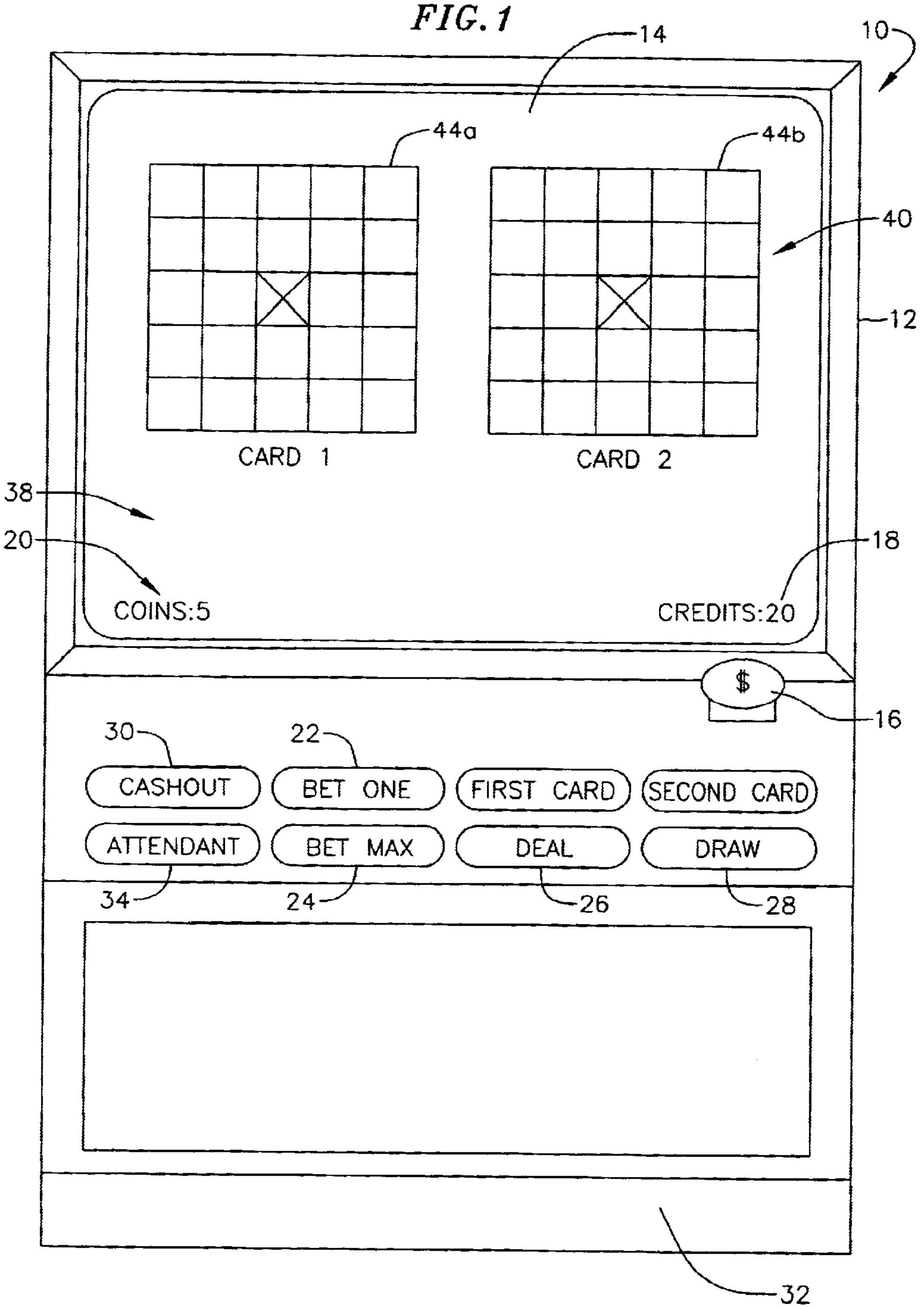
FIG. 1 is a front view of a device for playing the game according to the present invention.

Turning to FIG. 1, a device 10 according to the present invention is shown which includes a housing 12 mounting a video display 14. Contained within the housing 12 is a processor (not shown) which controls the play of the game as hereinafter described.

The housing 12 is provided with means for the player to control the play of the game. These means may be embodied as touch screen technology at the display 14 or may include separate buttons disposed on the housing 12 as shown in FIG. 1. Accordingly, means are provided for the player to make a wager to play the game such as a token acceptor 16 whereby, as is well known, the player may insert coins or tokens as wagers for the game. Alternatively, any other suitable means may be used for the player to make a wager such as by using a cash validator, debit card, script or the like. As shown in FIG. 1, the display 14 may display at a credit meter 18 accumulated credits available for the player to wager on the game. Also the display 14 may display at a coin in location 20 the amount wagered for the particular play of a hand of the game.

To control play, the device 10 includes a bet 1 button 22 whereby the player may control the device 10 to wager a single unit or credit. Also included is a bet max button 24 whereby a player by depressing the button, may wager the maximum amount available for play of the device 10. For example, depressing of the bet max button 24 will wager five units or credits for the play of each Bingo card played as hereinafter described. Also provided for the housing 12 is a deal button 26 whereby the player prompts the play of the game. Typically if a player wagers the maximum amount by depressing the bet max button 24, the play is automatically prompted. If the player wagers less than a maximum amount, he must depress the deal button 26 to prompt play. A draw button 28, as hereafter described, prompts the processor within the device 10 to draw replacement cards, if provided, during play of the video poker hand component of the game. There is also provided a cash out button 30 which, if depressed, controls the processor within the device 10 to dispense the accumulated credits as coins or tokens into a tray 32 for the device 10. An attendant button 34, if depressed, generates a signal by lightning a light by calling an attendant to the device 10.

Continuing with FIG. 1, the display 14 includes a selection location 38 wherein the selections for the game are displayed in any desirable configuration to show the player the selections. For example, in the selection location 38 there may be displayed a depiction of a Bingo cage which is animated to show the mixing and selection of the Bingo "balls". Also the display 14 includes a Bingo game card area 40 in which one or more matrices for the game are displayed as enabled by the player.

With reference to the matrices defining the one or more game cards 44*a,b*, each matrix is a 5×5 matrix defining twenty-five coordinates arranged horizontal rows and vertical columns as illustrated and as is well known in Bingo. Each coordinate on the matrix is adapted to, as described below, display information identifying a number and column, the columns denoted as B-I-N-G-O, also as is well known concerning Bingo. While only two cards 44*a,b* are shown as including at the coordinates playing card designations, it is to be understood that fewer or more Bingo game cards could be provided. If desired, the center coordinate of the matrix may be designated by an "X" or "free" designation indicating that location on the matrix is provided to the player regardless of whether or not any other coordinates are marked during play of the game. Alternatively, there may be no free coordinate on the matrix.

Figure 2:
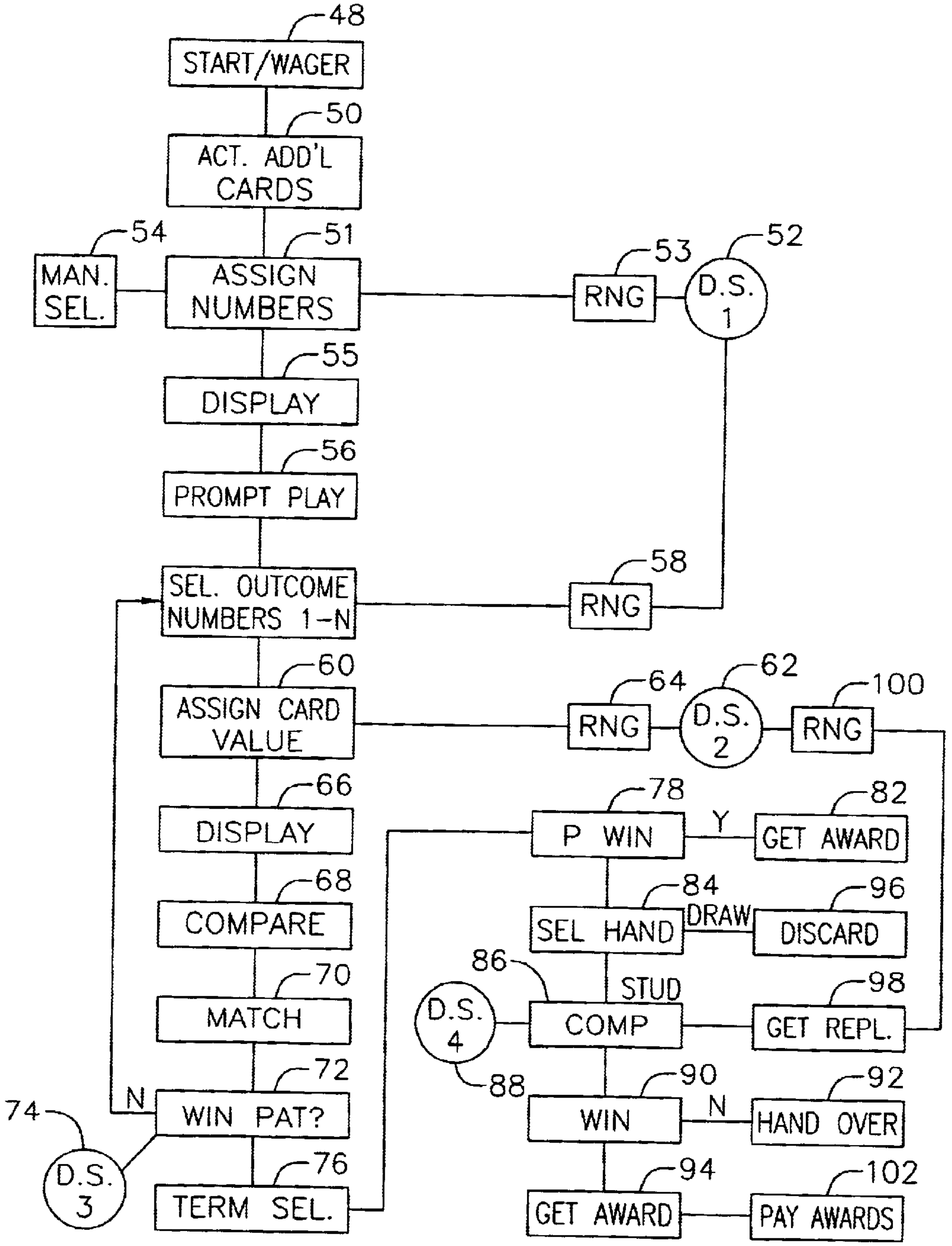
FIG. 2 is a logic diagram showing the play of the game.

With reference to FIG. 2, the play of the game according to the present invention will now be described. At 48 the player makes a wager to play the game. At 50 the player may select to enable a single game card 44*a* by depressing first game card button 52 (FIG. 1). The player may also enable the second Bingo game card 44*b* by depressing second card button 60 and inputting a wager. The wager made in regards to the second game card 44*b* may be the same as, less than or greater than the wager made to play the first game card 44*a*. Thus it is to be appreciated that the player can enable one or more Bingo game cards 44*a,b* and wager upon them in the maximum amount, by depressing the max wager button 24 or in another amount by depressing the bet one credit button 22. As illustrated in FIG. 1 for purposes of this description, the player has enabled two Bingo game cards 44*a,b*. When enabled the processor at 51 assigns the Bingo numbers to the coordinates of each enabled card 44*a, b* as well as a processor Bingo card stored in the processor's memory. The numbers selected are shown as being selected from a first data structure 52 though a random number generator 53. For the more of the processor's Bingo card(s) against which the player is competing, the numbers are randomly selected. For the player's cards 44*a, b*, the player at 54 may manually select the numbers. At 55 the cards 44*a, b* and their Bingo numbers are displayed. If desired or required, the processor's selected Bingo card(s) may also be displayed. Each displayed card has, as is conventional with Bingo, numbers assigned to each of the columns, except that the center coordinates may be marked "Free", again as is known with traditional Bingo.

At 56 the player prompts play of the game whereupon the processor from the first data structure 52 storing the Bingo numbers and by, for example a random number generator 58 begins the number selection process. As each Bingo number is drawn, the display 14 may be controlled to show Bingo balls each having a number and column letter, drawn from a Bingo hamper. As each ball is selected, at 60 the processor assigns to each ball a card value (suit and value). The display 14 may be controlled by the processor to display a card, e.g.

4♡, attaching to a ball, e.g. B15. The card value to be assigned are selected from a second data structure 62 storing data representing the universe of playing cards to be assigned and using a random number generator 64. The number and assigned value is displayed at 66 at outcome location 38 for the player to confirm the selection.

At 68 the selected Bingo number is compared to the numbers on the players cards 44*a, b* as well as the processor's card (representing the house) to determine if there is a concordance. If at 70 there is a match, the processor controls the display 14 to mark the coordinate of the match on the Bingo card. The marking may be by any suitable mark. Further, at the marked coordinate, the assigned card value is displayed. For example, at the matching coordinate, the processor may control the display 14 to alternatively flash the casino's logo and the assigned card value or to simple show the card value, e.g. the 4♡ as the mark for the coordinate. If there is no matching number on the Bingo card, the selected ball and card value are displayed in location 38.

After each number is selected, the processor compares at 72 the marked coordinate patterns on each card to determine if (1) the processor's card has obtained a predetermined winning Bingo pattern or if (2) each enabled player Bingo card 44*a, b* has obtained a winning pattern. These winning patterns may be marked coordinate positions creating a filled row, column, four corners, diagonal or the like. The predetermined winning Bingo patterns are stored in a third data structure 74. If the assigned processor Bingo card(s) is/are first to have a winning Bingo pattern, at 76 the selection of numbers is terminated and the player loses the Bingo component of the game. If at 78 it is determined that the enabled player cards obtain a winning patterns before the processor assigned card does, the player wins the Bingo component of the game. Thus it is to be understood that each player enabled Bingo card competes with the processor Bingo card(s) to first obtain a winning pattern. The number of the processor's Bongo card(s) may vary from one to ten or more and the number may be selected to, based on statistics, to control the win frequency for the player. Upon resolution of each player Bingo card 44*a, b*, at 76 the selection of numbers is terminated. For the each winning pattern obtained at 80 on any player Bingo card, the processor retrieves the predetermined award at 82 which may be stored in the third data structure 74.

Upon resolution of the Bingo component of the game as either a player Bingo win or loss, the player now plays the Poker component of the game. At 84 for each enabled card 44*a, b* the player selects a row, column or diagonal to play based upon the (1) marked coordinates and (2) the card values assigned to those marked coordinates. Below shows an example of a marked card which was a winning Bingo card and one which was a losing Bingo card.

Winning Card

| | | | | |
|---|---|---|---|---|
| 4♡ | | | Ace♧ | |
| | 4♧ | | | |
| Queen♧ | | Free | | |
| Jack♢ | | | King♢ | |
| | | | | King♧ |

Losing Card

| | | | | |
|---|---|---|---|---|
| 4♡ | | | Ace♧ | |
| Queen♡ | | Free | King♢ | |
| Jack♡ | | | | |

For the winning Bingo card, the player would select at 84 the diagonal to play which has two pair. The player, by touching the desired row would select the two pair their Poker hand. According to one embodiment of the game played in a stud fashion, the player has no opportunity to discard and draw cards. Thus, according to this game, the processor at 86 compares the cards of the hand selected to data stored in a fourth data structure 88 representing winning Poker hands. If the player has obtained in the playing cards selected a winning combination (e.g. two pair), at 90 the processor at determines that a winning combination has been obtained the processor at 92 terminates play of the Poker component for this enabled Bingo card and at 94 gets the corresponding award from, stored data such as from the fourth data structure 88. Each card is serially played and awards issued for winning Poker combinations. Where the player selects a row, column or diagonal to play, blank (unmarked) coordinates in that row, column or diagonal may be designated as wild or as Aces or wild to fill a straight or flush. Thus for the losing Bingo card above the first column would result in a flush and the player would be entitled to an award.

According to another embodiment, for the row, column or diagonal on the player Bingo card matrix selected by the player, the player at 96 may be given the option of discarding playing cards marked the selected column, row or diagonal of the Bingo cards 44*a,b* and receiving at 98 replacements selected, through a random number generator 100 as is well known in video Poker devices, from the second data structure 62. The replacement cards selected are displayed and at 86 compared to the data stored at the fourth data structure 88 to determine if at 90 a winning, final Poker hand has been obtained. If the player has obtained a winning Poker hand, at 94 the correspond award is retrieved.

To select which cards the player wishes to replace, if a touch screen is provided, the player may simply touch the cards to be discarded and replaced. Any other suitable means such as a light pen, mouse, buttons or the like may be used.

At 102, upon completion of both the Bingo and Poker components of the game, the awards are issued to the player by dispensing coins/tokens, accumulating credits or the like.

The game according to the present invention may be played in a manner whereby the player may enable one, two or more game Bingo cards. Furthermore, the game may be played with any traditional video poker game including Deuces Wild, Joker's Wild, or other types of traditional poker games. Still further, the device and method of the present invention may be played where separate hands are drawn for each enabled Bingo game card and the player may hold or discard.

The game according to the present invention provides the player with multiple opportunities to win. The player can win by obtaining a winning Bingo pattern, by obtaining a winning Poker hand or both. Further large jackpots can be provided for obtaining predetermined Bingo patterns and predetermined Poker hands. For example, receiving a Royal Flush and marking a column or row on a Bingo card could award a very large jackpot.

Further, the game can be played as a linked game where multiple devices are linked together through a local area network, wide area network, telephone lines or the Internet. In this instance, instead of providing virtual or processor Bingo cards, each participant would have one or more enabled Bingo cards and cards would be selected until one of the participating player's enabled Bingo cards has marked thereon a predetermined pattern such as a column. Row, "X" pattern, corners or the card is completely filled. The first player receiving the pattern would win the Bingo game. All participating players would have each of their cards examined to determine whether they have obtained a winning Bingo and/or Poker hand outcome.

The method and device described above can also be incorporated into a Keno game as well. From matching player selected numbers and drawn numbers, the player may form Poker hands, or the game may be played by the player selecting rows, columns, diagonals, sections or the like.

While I have shown and described certain embodiments of the present invention, it is to be understood that it is subject to many modifications and changes without departing from the spirit and scope of the present invention.

I claim:

1. A method for playing a video gaming machine including features of Poker and Bingo comprising:

providing a processor including a first data structure storing data corresponding to a display of a matrix of positions arranged in vertical columns and horizontal rows defining a Bingo card and a second data structure storing data representing playing cards;

a player inputting a wager and prompting the processor to play a hand of play on the machine;

the processor, in response to prompting controlling an electronic display to (i) display at least one player Bingo card matrix of coordinates, each coordinate including a Bingo number and (ii) to store a virtual Bingo card matrix, each coordinate including a Bingo number, (iii) randomly select and display at the display outcome set Bingo numbers, (iv) compare the outcome set Bingo numbers as they are selected to the player and virtual Bingo card's numbers and if a concordance exists, record said concordance, (v) for each player Bingo card, randomly selecting, assigning and displaying from said second data structure a playing card corresponding to each coordinate for each concordance and (vi) select and display said outcome set Bingo numbers until one of said virtual or player Bingo cards records a predefined Bingo pattern;

if said virtual Bingo card first records said predefined Bingo pattern, concluding the game hand, if a said player Bingo card first records said predefined Bingo issuing an award to the player for obtaining the Bingo; and for the player Bingo card, comparing the playing cards assigned to said coordinates of at least one of a row, column, four corners or diagonal pattern and if said compared cards define at least one of a predetermined winning holding, issuing an award to the player.

2. The method of claim 1 comprising the player selecting at least one of a row, column, four corners or diagonal pattern of coordinates on said player Bingo card, the playing cards corresponding to the coordinates of said selected pattern defining a Poker holding and if said Poker holding defines one of a predetermined winning holding issuing an award to the player.

3. The method of claim 1 comprising the player from the Poker holding discarding unwanted cards, said processor randomly selecting and displaying from said second data structure replacements therefor to define a final Poker holding and comparing said final Poker holding to a schedule of winning Poker holdings and if the Poker holding corresponds to a winning video poker hand, issuing an award to the player.

4. The method of claim 2 comprising any coordinates in a row, column or diagonal which do not include a playing card display are designated as wild for determining the Poker holding.

5. The method of claim 1 comprising any coordinates in a row, column or diagonal which does not include a playing card designated as Aces or are wild to fill a straight or flush for determining the Poker holding.

6. The method of claim 1 comprising providing a jackpot award and issuing said jackpot award where a designated a winning Poker holding corresponds to a winning bingo matrix pattern.

7. A device for playing a video gaming machine including features of Poker and Bingo comprising:

a processor including a first data structure storing data corresponding to a display of a matrix of positions arranged in vertical columns and horizontal rows defining a Bingo card, a second data structure storing data representing playing cards and a third data structure storing data representing winning Poker holdings;

wager input apparatus for a player to input a wager to play a hand of play on the device;

means for the player to prompt play of a hand of play;

an electronic display;

the processor configured to control the display to (i) display at least one player Bingo card matrix of coordinates, each coordinate including a Bingo number and (ii) to store a virtual Bingo card matrix, each coordinate including a Bingo number, (iii) in response to prompting by the player randomly select and display at the display an outcome set Bingo numbers, (iv) compare the outcome set Bingo numbers to the player and virtual Bingo card's numbers and if a concordance exists, record said concordance, (v) for each of said player Bingo card, recording said concordances by randomly selecting, assigning and displaying from said second data structure a playing card at the coordinate for each concordance and (vi) select and display said outcome set Bingo numbers until one of said virtual or player Bingo cards records a predefined Bingo pattern, (vii) if said player card first records said predefined Bingo pattern, issue an award to the player for obtaining the Bingo;

said processor configured to compare the playing cards of at least one of a row, column, four corners or diagonal pattern of coordinates on said player Bingo card, the playing cards defining at least one Poker holding, said processor configured to compare said at least one Poker holding to the data of said third data structure and if said at least one Poker holding defines one of a predetermined winning holding, said processor configured to issue an award to the player.

8. The device of claim 7 comprising means for said player to select at least one of a row, column, four corners or diagonal pattern of coordinates on said player Bingo card, the playing cards of said selected pattern defining a Poker holding, said processor configured to compare said Poker holding to the data of said third data structure and if said Poker holding defines one of a predetermined winning holding, said processor configured to issue an award to the player.

9. The device of claim 7 comprising means for the player to discard any unwanted cards of the Poker holding, said processor in response to said discarding (i) randomly selecting and displaying replacement cards from said second data structure for the Poker holding to define a final Poker holding, (ii) the processor comparing the final Poker holding to the data of the third data structures to determine if the final Poker hand is a winning hand and (ii) if the final Poker holding is a winning combination, said processor configured to issue a Poker holding award to the player.

10. The device of claim 7 comprising means for the player to select the numbers for the coordinates of each player Bingo card.

* * * * *